United States Patent
Glimpel et al.

(10) Patent No.: US 7,927,221 B2
(45) Date of Patent: Apr. 19, 2011

(54) TOOL AND METHOD FOR THE PRODUCTION OF A THREAD

(75) Inventors: Helmut Glimpel, Lauf (DE); Dietmar Hechtle, Pegnitz (DE); Thomas Zeus, Hersbruck (DE)

(73) Assignee: Emuge-Werk Richard Glimpel GmbH & Co., Lauf (DE)

( * ) Notice: Subject to any disclaimer, the term of this patent is extended or adjusted under 35 U.S.C. 154(b) by 990 days.

(21) Appl. No.: 11/374,919

(22) Filed: Mar. 14, 2006

(65) Prior Publication Data

US 2008/0000282 A1 Jan. 3, 2008

(51) Int. Cl.
*B21J 13/02* (2006.01)

(52) U.S. Cl. .......................... 470/204; 470/84

(58) Field of Classification Search ............... 470/10, 470/66, 84, 198, 199, 204, 57, 58, 200; 408/222
See application file for complete search history.

(56) References Cited

U.S. PATENT DOCUMENTS

| | | | | |
|---|---|---|---|---|
| 3,850,074 A | * | 11/1974 | Simons | 411/416 |
| 3,939,512 A | * | 2/1976 | Thurston et al. | 470/10 |
| 4,087,131 A | * | 5/1978 | Peterson et al. | 299/18 |
| 4,539,832 A | * | 9/1985 | Koller | 72/118 |
| 5,039,265 A | * | 8/1991 | Rath et al. | 411/366.3 |
| 6,217,267 B1 | * | 4/2001 | Sugano et al. | 408/222 |
| 6,685,573 B2 | * | 2/2004 | Hikosaka et al. | 470/204 |
| 7,147,413 B2 | * | 12/2006 | Henderer et al. | 408/144 |
| 7,150,476 B2 | * | 12/2006 | King | 285/197 |

FOREIGN PATENT DOCUMENTS

EP 1698419 * 9/2006

OTHER PUBLICATIONS

Tool Manufacturing and Engineers Handbook, vol. 1, machining, Drozda et al. Chapter 12, pp. 91-92. Fourth Edition, 1983.*
Brochure "Emuge Threading Technology; Innoform Cold-Forming Taps Chipless Production of Internal Threads," by Emuge-Werk Richard Glimpel GMBH & Co. KG—Fabrik Fur Prazisionswerkzeuge, Aug. 20, 2005.
Catalog (DE), "Emuge Thread Cutting Technology—Clamping Technology; Tool Catalog 130," by Emuge-Werk Richard Glimpel GMBH & Co. KG—Fabrik Fur Prazisionswerkzeuge, Mar. 1, 2005, to be uploaded in six (6) separate files due to space limitations. <http://www.emuge.de/english/median/kataloge/k130_131_emuge-katalog.html> File 1: Title Page Through p. 66.
Catalog (U.S.), "Emuge Threading Technology; Clamping Technology; 2005," by Emuge-Werk Richard Glimpel GMBH & Co. KG—Fabrik Fur Prazisionswerkzeuge, Aug. 20, 2004, to be uploaded in six (6) separate files due to space limitations. File 1: Title Page through p. 55 File 2: p. 56 through p. 127.

* cited by examiner

*Primary Examiner* — Edward Tolan
(74) *Attorney, Agent, or Firm* — Workman Nydegger

(57) ABSTRACT

The tool for the chipless production of a thread, in particular for producing an internal thread, is in its forming height, pitch of the pressing lands and/or pressing surfaces adapted to the material of the workpiece in a special manner.

17 Claims, 1 Drawing Sheet

TOOL AND METHOD FOR THE PRODUCTION OF A THREAD

BACKGROUND OF THE INVENTION

1. The Field of the Invention

The invention relates to a tool for the production of a thread, in particular for producing an internal thread, and a method for the production of a thread, in particular using the tool.

2. Background and Relevant Art

For thread production (including: thread rework), chipless methods and threading tools are known in addition to cutting methods and threading tools. An overview of thread-producing tools and working methods in use is given in the Handbuch der Gewindetechnik und Frästechik [Manual of threading practice and milling practice], publisher: EMUGE-FRANKEN, publishing firm: Publicis Corporate Publishing year of publication: 2004 (ISBN 3-89578-237-7), designated below only as "EMUGE manual".

Coming within the scope of chipless thread-production tools are "thread formers" or thread-grooving tools or cold-forming taps (cf EMUGE manual, chapter 9, pages 299 to 324) and, only for external threads, thread-rolling tools (cf EMUGE manual, chapter 11, pages 373 to 404).

Thread formers are threading tools which work axially relative to their tool axis and have a working region which has a helical arrangement, encircling the tool axis, of effective areas which are called forming wedges or pressing lobes or forming teeth and with which the thread is pressed into the workpiece during rotation of the tool about the tool axis and during axial feed along the tool axis. Thread formers therefore form the workpiece by pressure. The advantage of these chipless threading tools over cutting threading tools is that, due to the deforming of the surface and the hardening associated therewith, the hardness of the material in the region of the thread profile increases and thus a more wear-resistant thread can be produced. The shank is of cylindrical design as a rule and is accommodated and held with its end remote from the workpiece and working region in a chuck of a machine tool or of a drive.

The working region is provided with a thread-forming profile which constitutes the mating form for the thread to be produced; that is to say, in particular, it has the same thread pitch. In longitudinal section or in the thread profile, the thread-producing tool therefore has alternating prominences or teeth and recesses or grooves, which are normally at the same distance from one another in each case, which means that the pitch of the thread turns is constant. In their cross section, the teeth are designed so as to taper essentially radially outwards at an acute angle and are as a rule designed to be slightly rounded off in the tip or apex region. In the working region, the thread former has an approximately polygonal cross section as a rule, the effective areas or pressing lobes (forming wedges) forming the corner regions of the polygon. Grooves may run between the polygon corner regions or pressing lobes, and alternatively, or additionally, inner passages may run in the tool in each case for feeding coolant and/or lubricant.

The working region of the thread former normally narrows towards the tool tip in a usually tapered entry region or initial-forming region, i.e. the pressing lobes are offset inwards there with the shape largely unchanged. As a result, the thread profile, in particular the thread depth, is successively produced by the increasing radial infeed of the pressing lobes, and the penetration of the first pressing lobes or initial-forming teeth into the workpiece surface or the inner wall of the hole is facilitated and forming forces at the pressing lobes are reduced. The increase in the radial infeed or the radial distance from the tool axis between adjacent or successive pressing lobes or forming teeth in the entry region is also referred to as forming height.

In a guide or calibrating region following the starting region, the radial infeed or the radial distance or outside diameter of the pressing lobes or forming teeth remains constant. This region serves to guide the thread former in the thread produced by the starting region and if need be to subsequently smooth or calibrate the thread.

To produce an internal thread using a thread former, first of all a hole having a smaller outside diameter than the outside diameter of the working region of the thread former is produced in the workpiece, and the thread former, with the working region in front, is then inserted into the hole with a corresponding feed and while rotating about the longitudinal axis of the tool shank in the direction of rotation of the thread, that is to say clockwise in the case of right-hand threads and anticlockwise in the case of left-hand threads. In the process, the pressing lobes of the thread former are pressed into the surface of the workpiece or of the hole. The material of the workpiece is plastically deformed in the process and displaced radially into the recesses or grooves of the working region of the thread former. The torque increases during the initial forming until all initial-forming teeth are in engagement. After that, the thread former is unscrewed again, while rotating in the opposite direction, from the thread under decreasing sliding friction torque. As a rule, during the thread forming, the material springs back by the elastic proportion after the plastic deformation. Due to this displacement and also due to the elastic restoration, the core diameter of the produced thread, without rework, is smaller than the original outside diameter of the hole and also smaller than the thread part at the working region of the thread former.

Various practical embodiments of thread formers are described in the EMUGE manual, chapter 9, pages 301 to 322.

Here, there are embodiments of thread formers having a full point at the tool end and embodiments without a full point having a flat end face at the tool end in front of the initial-forming region. The initial-forming taper angle which describes the pitch or the radial increase or infeed and thus the forming height of the pressing lobes in the initial-forming region is the same in all embodiments. Only different initial-forming taper lengths in thread turns of over 2 to 3 or of over 3.5 to 1.5 or of 1.5 to 2 are described (page 322, 9.6.3). In the initial-forming taper region, complete thread teeth increase in diameter, as explained under 9.6.2 on page 322.

The material must be capable of being easily cold worked for the thread forming. Suitable for thread forming are, inter alia, light metals and light-metal alloys, in particular aluminum alloys, especially wrought aluminum alloys and cast aluminum alloys, and magnesium alloys, nickel and cobalt alloys, titanium and titanium alloys, non-ferrous metals, copper and copper alloys such as bronze or brass and tungsten-copper alloys, steels for general applications and stainless/acid-resistant/heat-resistant steels, cast materials such as cast iron, especially with graphite, and plastics. However, these materials partly have very different properties, in particular with regard to hardness, strength flow behavior, abrasion and adhesion.

In the EMUGE manual, chapter 9, pages 299 to 324, some properties of the thread forming are described with respect to the material of the workpiece and its material properties. It is thus explained that the maximum thread pitch that can be pressed is limited by the material properties, and experience shows that pitches over 3 mm no longer need to be formed.

For various materials and material groups, recommendations for the peripheral velocity of the thread former as a function of the material of the thread former, namely HSL-E (high-speed steel) with and without a coating of mechanically resistant material, and for solid carbide for forming part and shank part (VHM), and also a combination of solid carbide for the forming part and a tool steel for the shank (KHM) without coating are given on pages 320 and 321 in the EMUGE manual.

Furthermore, in the case of the actual tools described on pages 303 to 307 and 109 to 131 in the EMUGE manual and intended for some of the workpiece materials specified, it is proposed to use coatings as anti-wear protection or slide coatings and to use different materials for the coatings, for example, TiN or TiCN or TiAlN or CrN or diamond or slide coatings (MoS2, WC/C), and also even no surface coating at all in the case of other materials. In particular, coatings of the tool in the case of material adhesion at the tool are recommended (EMUGE manual, page 323).

For abrasive materials of the workpiece, carbide is recommended as the material of the tool (EMUGE manual, page 305). Furthermore, the use and selection of lubricants as a function of the workpiece material is described (EMUGE manual, page 311, bottom).

Furthermore, WO 02/094491 A1 discloses a chipless thread-forming tool and a method for chipless thread production which are based on a working principle that can be designated as circular thread forming. The thread-forming tool disclosed in WO 02/094491 A1 is elongated and comprises a working region and one or more annular circumferential profiles separated from one another by annular grooves. Each circumferential profile is of non-circular design like a polygon and has at least three pressing lobes. In addition, axially running grooves may also be provided between the individual pressing lobes at the outer surface of the tool for feeding cooling liquid. The material proposed for the tool is either a carbide or a high-speed steel.

In the method according to WO 02/094491 A1, this tool, while rotating about its own axis, is now inserted into a hole of larger diameter than the tool and performs a circular movement along the circumference of the hole and at the same time a feed movement into the hole and as a result forms the thread in the hole in a chipless manner.

According to WO 02/094491 A1, therefore, the thread, in contrast to the axial thread forming, is not formed by means of a helical effective area, adapted to the thread pitch, on the tool and an only axial or linear feed movement of the tool combined with a rotation about the tool axis, but rather by means of annular effective areas, which thus have no pitch and at the same time are polygonal in cross section, on the tool on the one hand and a helical movement of the tool on the other hand, this helical movement being combined with a rotation of the tool about its own longitudinal axis and resulting from a linear feed movement axially with respect to the longitudinal axis of the tool and a circular movement of the longitudinal axis of the tool about the centre axis of the hole.

A further circular thread former has also been disclosed by DE 103 18 203 A1. This known circular thread former has at least one and preferably at least two profile projections on its forming head which are designed to be polygonal and continuous over the circumference and with a radial extent varying over the circumference. As a result, the profile projections form in each case a plurality of pressing lobes over the circumference, which may be distributed uniformly or even non-uniformly over the circumference. Furthermore, at least in the region of the pressing lobes, the forming head may be provided with a coating for reducing the friction and/or the wear.

BRIEF SUMMARY OF THE INVENTION

The object of the invention is to specify a thread-producing tool and a method for thread production using the thread-producing tool, in which novel adaptation of the tool to different materials of the workpiece is possible.

This object is achieved with regard to the tool with the features of the apparatus and method claims. Advantageous embodiments and developments follow from the patent claims which are dependent upon the apparatus and method claims, respectively. The subject matter which can be claimed is not limited to the current claims or their combinations by the current references back of the claims and contains also any technically possible combination of any features or sub-features in the claims.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
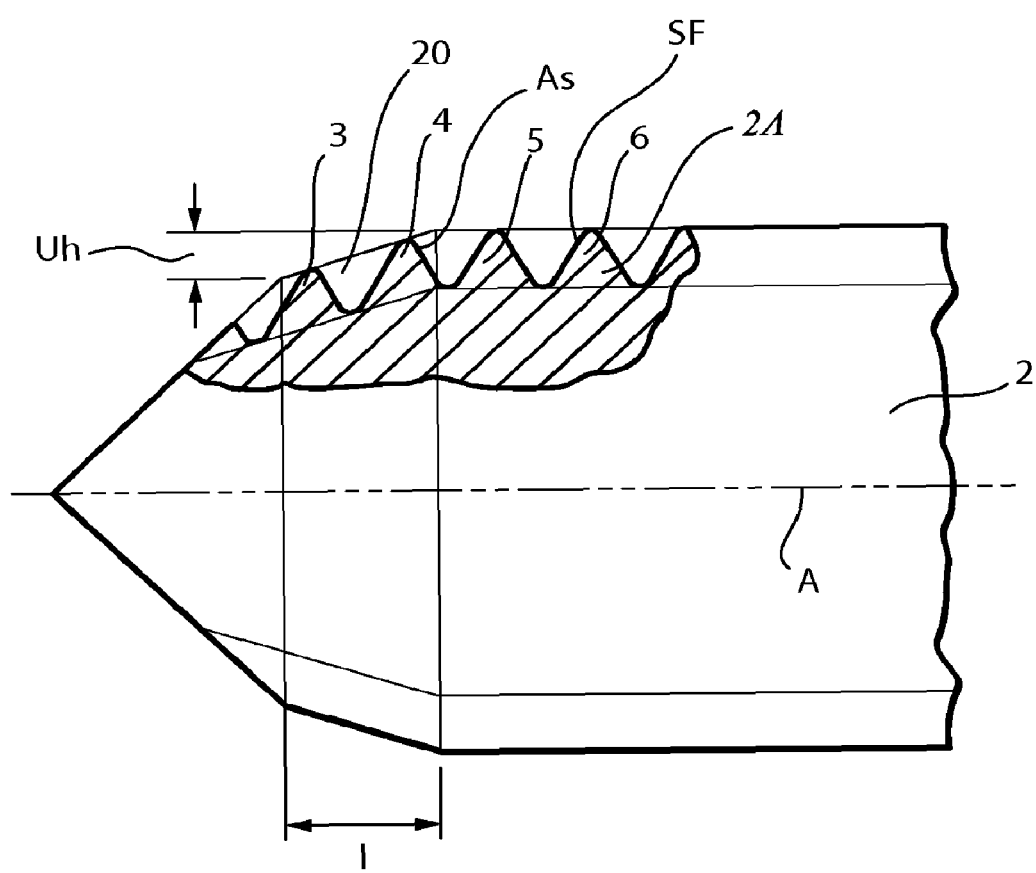
FIG. 1 shows in a diagram a thread forming tool in accordance with an implementation of the present invention.

The tool for producing a thread according to an apparatus claim herein is rotatable about a tool axis and has a working region having a plurality of pressing lobes (or: forming teeth, forming wedges) which are arranged axially off-set from one another with respect to the tool axis and are intended for pressing (or: forming, plastically forming) the thread in a surface of a workpiece.

The invention, then, is based on the idea of adapting the thread-forming tool in geometrical parameters or features to the material of the workpiece in which the thread is to be produced, or of designing said thread-forming tool for the respective material.

According to the apparatus claim, first of all the three following geometrical parameters or features are suitable alternatively as variants or in any desired combination, i.e.

one, two or all three of these parameters being adapted to or chosen as a function of or dependant on the workpiece material:

In a first variant of the adaptation of tool to workpiece material, the maximum (or: outer) radial extension (or: outer or maximum radial distance, outer radius, outer dimension) of the pressing lobes (or: their outer surface or surface pointing (radially) outwards), in a section (or: entry region, starting region, initial-forming region) of the working region or also in the entire working region, increases from the tool axis with increasing axial distance from a tool end (or: end face of the tool) with respect to the tool axis according to a predetermined monotonically increasing extension function of the radial extension as a function of the axial position of the pressing lobes. The resulting pressing-in volume or displaced volume in the thread turn in the workpiece thus also increases, and the thread therefore continues to be successively shaped by the pressing lobes increasing in their radial distance. This radial extension function for the pressing lobes or the increase or difference in the radial distance of the pressing lobes (forming height, radial infeed), is now selected or set as a function of the material of the workpiece. As a result, the performance of the tool is increased.

In a second variant, the tool is adapted to the material of the workpiece by virtue of the fact that the radial distance of a central pressing land (or: pressing ridge) which runs in a feed direction of the pressing lobe relative to the workpiece and forms the pressing-lobe region projecting radially furthest to the outside and/or is essentially reproduced on the thread root of the thread produced in the workpiece increases monotonically against the feed direction according to a predetermined radial distance function up to a maximum radial distance (and then usually decreases again), and this radial distance function of the pressing land of each pressing lobe is selected as a function of the material of the workpiece. In other words, the side regions, increasing to the pressing lobe tip, of the pressing lands are thus adapted in their increase to the material to be worked. As a result, the radial flow component of the workpiece material can be influenced during the forming of the thread, in particular for taking into account high forming forces and/or the flowability and/or the adhesion of the material to be worked.

Finally, in a third variant, the pressing surfaces, coming into engagement or contact with the workpiece, of the pressing lobes are selected in shape and/or size and/or arrangement as a function of the material of the workpiece. As a result, in particular the adhesion of the workpiece material can be taken into account.

A radial direction is in this case defined as running perpendicularly to the tool axis through or away from the latter, and an axial direction is defined as running along or parallel to the tool axis.

The expression "monotonically increasing" refers to a function which increases at least in sections or in steps or also continuously (strictly monotonically).

According to the invention, therefore, at least the forming height in an entry region or initial-forming region, the pressing-land configuration of the pressing lobes and the pressing surfaces (or: contact surfaces) of the pressing lobes on their own or in any desired combination are provided as geometrical parameters of features for adapting the tool to the workpiece material. A selection (or: set, kit) of differently designed thread-forming tools for different workpiece materials is thus obtained Therefore, preferably a set or collection of several different tools is provided or made available which tools are, according to the invention, designed for different material property ranges or different materials or material types or material classes of the workpiece.

With the method according to the claims:
a) at least one first thread is produced in a first workpiece made of a first material using a first tool according to the invention, this first tool being adapted to the first material, and
b) at least one second thread is produced in a second workpiece made of a second material using a second tool according to the invention, this second tool being adapted to the second material.

However, the tool may also be adapted in further parameters or properties to the material to be worked. This and further embodiments are the subject matter of some of the patent claims dependent upon the claims.

In addition, therefore, the material of the tool, at least in the region of the pressing lobes, in particular with regard to wear resistance and/or toughness, and/or the material of a surface coating on the tool at least in the region of the pressing lobes, in particular with regard to sliding friction, hardness and/or thermal stability, and/or the shape, in particular the cross-sectional shape, of the pressing lands, in particular their radial curvature perpendicularly to the feed direction, can be adapted to the material of the workpiece.

In an advantageous embodiment, the number of pressing lobes at the circumference or in an arrangement about the tool axis, in particular the number of polygon corners in a polygonal basic shape, is adapted to the material of the workpiece. This embodiment is preferably suitable for setting the radial extension function in the entire or initial-forming region by virtue of the fact that, at a length, predetermined as a rule by the actual application, of the entry or initial-forming region and at a predetermined thread pitch, the difference(s) in the radial extensions of adjacent pressing lobes or the forming height is reduced by a larger number of pressing lobes, or conversely is increased in the case of a smaller number.

The tool is adapted to the material of the workpiece preferably with regard to one or more of the following material properties of the workpiece:
Flow properties, in particular flowability or toughness or plastic deformability
Abrasiveness or wear resistance
Adhesion In an especially advantageous embodiment, for workpiece materials having higher flowability, an extension function of the pressing lobes and/or a distance function of the pressing lands is set with a, at least on average, larger pitch (or: first derivative or gradient or slope) with respect to the axial distance or axial position than for a workpiece material having lower flowability, at least if the difference in the flowability of the two materials is greater than a predetermined minimum value or is sufficiently large.

In a further especially advantageous embodiment, for a material of the workpiece having higher adhesion at the surface of the pressing lobes, the pressing surfaces of the pressing lobes are selected to be smaller and/or the pitch of the radial distance function of the pressing lands is selected to be larger than for a material of the workpiece having lower adhesion, at least if the difference in the adhesion is greater than a predetermined minimum value, i.e. if it is sufficiently large.

In order to also retain the degree of freedom in the design of the pressing lands, the pressing surfaces are preferably varied at the flank regions of the pressing lobes (pressing flanks) as a function of the workpiece material, that is to say at the regions which laterally adjoin the central pressing land perpendicularly to the feed direction of the pressing lobe relative to the workpiece, and/or are essentially reproduced on the thread flanks of the thread produced. In particular, the cross section perpendicularly to the feed direction of the pressing lobes can partly be reduced here. Thus, for example in the region of the highest prominence (pressing lobe tip) of the pressing lands or at the maximum radial extent of the pressing lobes, material may be absent at the flank regions, in particular it nay be removed, preferably ground off, preferably in the form of a region widening radially outwards, preferably a triangle, which may either extend radially inwards up to the root of the flank regions or may also end in the flank regions and may then run radially further inwards over a linear land. This reducing measure at the flank regions is to be matched to the pressing lobe configuration with regard to its stability, especially at high forming forces.

Especially advantageous is a division of the tools into at least two, preferably at least three, categories with regard to the material-dependent parameters or properties, in particular with regard to the pitch of the radial extension function of the pressing lobes, the pitch of the radial distance function of the pressing lands, and the size of the pressing surfaces of the pressing lobes. A value or value range to be set is assigned to each of these categories, so that at least one lowermost category having at least one lowest value or having a lowest value range, preferably at least one average or intermediate or middle category having at least one average value or having an average value range, and at least one uppermost category having at least one highest value or having a highest value range are obtained.

For materials which are worked frequently, the categories and/or value ranges can be selected as follows:

1. Wrought aluminum alloy (AL):
a) Pitch of the radial distance function of the pressing lands: uppermost category and/or value range of 45% up to 100% above a distance base value (i.e. 1.45 up to 2.0 times the distance base value)
b) Size of the pressing surfaces of the pressing lobes: lowermost category and/or value range of 0% up to 50% above a surface base value (i.e. 1 up to 1.5 times the surface base value)
c) Preferably: pitch of the radial extension function of the pressing lobes or forming height: average or upper or uppermost category and/or value range of 50% up to 100% above an extension base value (or: forming height base value)

2. Cast aluminum alloy with silicon content (GAL):
a) Pitch of the radial distance function of the pressing lands: lower or lowermost category and/or value range of 0% up to 55% above the distance base value
b) Size of the pressing surfaces of the pressing lobes: upper or uppermost category and/or value range of 50% up to 100% above the surface base value
c) Pitch of the radial extension function of the pressing lobes or forming height: lower or lowermost category and/or value range of 5% up to 55% above the extension base value 3. Poorly flowing: abrasive steel material, such as H steel material:
a) Pitch of the radial distance function of the pressing lands: lower or lowermost category and/or value range of 0% up to 55% above the distance base value
b) Size of the pressing surfaces of the pressing lobes: upper or uppermost category and/or value range of 50% up to 100% above the surface base value
c) Pitch of the radial extension function of the pressing lobes or forming height: lower or lowermost category and/or value range of 0% up to 50% above the extension base value 4. Readily flowing steel material, such as ST steel material:
a) Pitch of the radial distance function of the pressing lands: average or upper category and/or value range of 35% up to 85% above the distance base value
b) Size of the pressing surfaces of the pressing lobes: upper category and/or value range of 40% up to 90% above the surface base value
c) Pitch of the radial extension function of the pressing lobes or forming height: average category and/or value range of 30% up to 80% above the extension base value 5. Stainless steel, such as VA steel:
a) Pitch of the radial distance function of the pressing lands: average or upper category and/or value range of 25% up to 80% above the distance base value
b) Size of the pressing surfaces of the pressing lobes: lower or lowermost category and/or value range of 0% up to 50% above the surface base value
c) Pitch of the radial extension function of the pressing lobes or forming height: lower or average category and/or value range of 5% up to 60% above the extension base value 6. Tough, high-strength steel material, such as Z steel or Z steel alloy:
a) Pitch of the radial distance function of the pressing lands: average or upper category and/or value range of 40% up to 95% above the distance base value
b) Size of the pressure surfaces of the pressing lobes-average category and/or value range of 30% up to 80% above the surface base value
c) Pitch of the radial extension function of the pressing lobes or forming height: average or upper category and/or value range of 45% up to 95% above the extension base value 7. Soft steel material, such as W steel:
a) Pitch of the radial distance function of the pressing lands: upper or uppermost category and/or value range of 45% up to 100% above the distance base value
b) Size of the pressing surfaces of the pressing lobes: lower or lowermost category and/or value range of 0% up to 5% above the surface base value
c) Pitch of the radial extension function of the pressing lobes or forming height: upper or uppermost category and/or value range of 50% up to 100% above the extension base value.

The respective base values are determined empirically and in advance dependant upon the thread profile of the thread to be produced and upon the workpiece materials to be worked.

Preferably, the radial extension function of the pressing lobes of the forming height and/or the radial distance function of the pressing lands increase/increases strictly monotonically, i.e. the first derivative is always greater zero.

In particular advantageous a linear radial extension function is chosen, which corresponds to a conical initial-forming section or working section. Such an embodiment is easily produced. Here, preferably, the forming height or difference between initial value and end value of the extension function in the entry or initial-forming section or whole working section is chosen as parameter dependant on the workpiece material, since the progression of the extension function is already determined because of its linearity.

Nevertheless, the radial extension function can also be a function of the group of functions comprising a rational or fractional rational function of the nth order, a root or power function, an exponential function or a logarithmic function, or a spiral function, e.g. an Archimedean or logarithmic spiral, or a function interpolated in particular by interpolation polynomials or spline functions. Also the radial distance function can be a linear or any of these functions.

The invention is preferably used in the case of axially working thread formers having pressing lobes arranged along a thread at a thread pitch, but may likewise be used in the case of circular thread formers.

In a development, grooves running in the longitudinal direction are provided at the circumference of the tool or at least one passage is provided in the interior of the tool for directing a fluid medium, in particular a coolant and/or lubricant. During the thread-producing process, the working region may heat up to a considerable extent due to the friction between the tool and the surface of the workpiece. In order to reduce the friction and/or the development of heat and to dissipate the heat produced, the coolant and/or lubricant can be directed into the grooves from the tool shank to the tip of the tool and can flow over from there out of the working region. The grooves or passages running in the longitudinal direction can be designed to be straight or twisted or with a turn about the circumference of the tool.

Further exemplary embodiments follow from the Table 1 below:

Advantageous numerical values for the categories for the forming height Uh (difference or increase of radial extension function over the initial-forming region or whole working region), the pitch of the radial distance function SF of the pressing lands as well as for the size As of the pressing surfaces of the forming wedges dependent upon the workpiece materials AL, GAL, H, ST, VA, Z and W mentioned before are given:

(i) in the examples according to the following

TABLE 2

|     | Uh % | | SF % | | As % | |
| --- | --- | --- | --- | --- | --- | --- |
|     | min | max | min | max | min | max |
| AL  | 50  | 100 | 45  | 100 | 0   | 50  |
| GAL | 5   | 55  | 0   | 55  | 50  | 100 |
| H   | 0   | 50  | 0   | 55  | 50  | 100 |
| ST  | 30  | 80  | 35  | 85  | 40  | 90  |
| VA  | 5   | 60  | 25  | 80  | 0   | 50  |
| Z   | 45  | 95  | 40  | 95  | 30  | 80  |
| W   | 50  | 100 | 45  | 100 | 0   | 55  |

| Workpiece material | Main influence on the functioning of the tool | Design | | |
| --- | --- | --- | --- | --- |
| | | Geometry | Substrate | Coating |
| AL (wrought aluminium) | High adhesion, good flow behaviour, low forming forces | Very high pitch of the distance function of the pressing land or very steep polygon or very steep forming tooth (produces pronounced radial force component against adhesion), minimum forming surface (minimum contact surface for adhesion), large forming height (simple and constant flow with acceptable forming forces) | Low requirements | Very good sliding properties |
| GAL (cast aluminium containing silicon) | Unfavourable flow behaviour (poor workpiece surface), low forming forces, abrasive | Low pitch of the distance function of the pressing land or flat polygon or flat forming tooth (moderate radial flow), larger forming surface (subsequent smoothing), low forming height (stable flow process without tearing of the material) | Wear resistance, high hardness | High hardness |
| H (poorly flowing steel materials) | Unfavourable flow behaviour (poor workplace surface), average forming forces, abrasive | Low pitch of the distance function of the pressing land or flat polygon or flat forming tooth (moderate radial flow), larger forming surface (subsequent smoothing), low forming height (stable flow process without tearing of the material) | Wear resistance, high hardness | High hardness |
| ST (steel for general applications) | Favourable flow behaviour, high forming forces | High pitch of the distance function of the pressing land or steep polygon or steep forming tooth (radial flow component), larger forming surface (mechanically stable forming tooth), average forming height (good flow with acceptable forming forces) | Wear resistance and toughness | High hardness and thermal stability |
| VA (stainless steels) | Adhesive, high forming forces | High pitch of the distance function of the pressing land or steep polygon or steep forming tooth (radial flow component), larger forming surface (avoidance of adhesion and reduction of clamping friction at the tooth), small to average forming height (forming heights not loo large, with acceptable forming forces) | Wear resistance and toughness. | Good sliding properties, high hardness and thermal stability |
| Z (tough, high-strength steels and steel alloys) | Very high forming forces | High pitch of the distance function of the pressing land or steep polygon or steep forming tooth (radial flow component), average forming surface (mechanical stability and reduction of the friction at the forming tooth), average to high forming height (reduction of the overall friction of all the teeth) | Maximum wear resistance and toughness | Maximum hardness and thermal stability |
| W (soft steel materials, low strength | Favourable flow behaviour, low forming forces | High to very high pitch of the distance function of the pressing land or steep to very steep polygon or steep to very steep forming tooth (pronounced radial flow component), small forming surface (reduced friction, stability not necessary on account of low forming forces), pronounced forming (simple and constant flow with acceptable forming forces) | Low requirements | High hardness | as relative values given in percent (%) above the lowest value or base value, which lies at 0%, wherein min is the minimal value and max the maximum value, and (ii) in the examples according to the following table 3 as absolute value ranges

TABLE 3

| Uh (mm) for M10 | |
|---|---|
| AL | 0.040 bis 0.500 |
| GAL | 0.025 bis 0.030 |
| H | 0.025 bis 0.030 |
| ST | 0.030 bis 0.040 |
| VA | 0.030 bis 0.040 |
| Z | 0.035 bis 0.045 |
| W | 0.040 bis 0.050 | referring to a thread former having a diameter of 10 mm. For another diameter of the tool the values have to be adapted accordingly. The initial-forming regions in these examples are chosen to be conical, i.e. have a linear radial extension function for the successive pressing lobes.

FIG. 1 shows a thread forming tool or thread former 2 in a longitudinal section with an entry region 20 having three forming teeth 3, 4 and 5 and a calibrating region 21, of which only one forming tooth 6 is shown. The forming teeth 3, 4 and 5 in the entry region or initial-forming region 20 increase linearly in the radial distance of their tips or outermost regions (their radial extension function) in the longitudinal direction measured along the central tool axis A from the end of the tool 2. The increase of the radial extension of these teeth 3, 4 and 5 corresponds to the forming height Uh. The length of the conical section in the entry region 20 is designated as 1. The forming surfaces As and the inclination SF of the flanks of the forming teeth 3 to 6 are shown schematically as well.

Without restricting the universality, the tool can (also) be adapted to the following materials in the manner specified:
Various steel materials having a strength up to about 1400 N/mm$^2$
Cast materials, in particular cast iron and cast iron with graphite
Copper, copper alloys, in particular brass and bronze and tungsten-copper alloys
Nickel-cobalt alloys
Aluminum alloys, in particular wrought aluminum alloys and cast aluminum alloys with different silicon content (GAL)
Magnesium alloys, in particular wrought magnesium alloys or cast magnesium alloys
Titanium and titanium alloys
Plastics, in particular thermosetting plastics, thermoplastics and fiber-reinforced plastics
Graphite
H High-strength materials, poor flow behavior
W Soft materials, in particular soft steel materials of low strength
Z Tough materials, in particular tough and high-strength steels and steel alloys, very high forming forces
VA Stainless steels, high adhesion, high forming forces
ST Steels in general application, favorable flow behavior, high forming forces
AL Wrought aluminum, high adhesion, good flow behavior, low forming forces.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:
1. Tool for producing a thread using cold forming,
a) which is rotatable about a tool axis and
b) comprises a plurality of cold forming pressing lobes which
b1) are arranged axially offset from one another and
b2) are intended for cold forming the thread into a surface of a workpiece and
b3) each comprise a central pressing land which runs in a feed direction of the cold forming pressing lobe relative to the workpiece and forms a pressing lobe region projecting radially furthest to an outside and/or is essentially reproduced on the thread root of the thread produced in the workpiece,
c) the tool being adapted to the material of the workpiece,
c1) by virtue of the fact that, at least at some of the cold forming pressing lobes, the radial distance of the pressing land increases monotonically, preferably strictly monotonically, against the feed direction according to a predetermined radial distance function up to a maximum radial distance, and that this radial distance function of the pressing land of each cold forming pressing lobe is selected as a function of the material of the workpiece, and
c2) by virtue of the fact that the pressing surfaces, coming into engagement or contact with the workpiece, of the cold forming pressing lobes are selected in shape and/or size and/or arrangement as a function of the material of the workpiece,
d) radial being defined as perpendicular to the tool axis and axial being defined as along or parallel to the tool axis;
e) wherein, for a predetermined selection of materials of the workpiece, a pitch of the radial extension function of the cold forming pressing lobes, a pitch of the radial distance function of the pressing lands, and the size of the pressing surfaces of the cold forming pressing lobes are in each case subdivided into at least two categories with regard to the values to be set, comprising:
at least one lowermost category having at least one lowest value or having a lowest value range; and
at least one uppermost category having at least one highest value or having a highest value range.

2. Tool according to claim 1, in which, for a material of the workpiece having higher flowability, a radial extension function of the cold forming pressing lobes and/or a radial distance function of the pressing lands are/is selected with a, at least on average, larger pitch than for a material of the workpiece having lower flowability, at least if the difference in the flowability of the two materials is greater than a predetermined minimum value.

3. Tool according to claim 1, in which the radial extension function and/or the radial distance function are/is a function of the group of functions comprising a linear function, a rational or fractional rational function of the nth order, a root or power function, an exponential function or a logarithmic function, a spiral function, in particular a logarithmic or Archimedean spiral, or a function interpolated in particular by Lagrange interpolation polynomials or spline functions.

4. Tool according to claim 1, in which each cold forming pressing lobe has flank regions which drop in their radial distance laterally and perpendicularly to the feed direction of the cold forming pressing lobe relative to the workpiece from a or the central pressing land and/or are essentially re-produced on the thread flanks of the thread produced, the arrangement and/or shape and/or size of the pressing surfaces at the flank regions being selected or set as a function of the material of the workpiece.

5. Tool according to claim 1, in which, for a material of the workpiece having higher adhesion at the surface of the cold forming pressing lobes, the pressing surfaces of the cold forming pressing lobes are selected to be smaller and/or the pitch of the radial distance function of the pressing lands is selected to be larger than for a material of the workpiece having lower adhesion, at least if the difference in the adhesion of the different materials is greater than a predetermined minimum value.

6. Tool according to claim 1, wherein at least one average or middle or intermediate category is provided as a third category having at least one intermediate or average value or having an intermediate or average value range.

7. Tool according to claim 6, in which,
a) in the case of a wrought aluminum alloy as material of the workpiece, the pitch of the radial distance function of the pressing lands is selected from the uppermost category, and the size of the pressing surfaces of the cold forming pressing lobes is selected from the lowermost category, and the pitch of the radial extension function of the cold forming pressing lobes or the forming height is preferably also selected from an intermediate or upper or the uppermost category,
b) in the case of a cast aluminum alloy with a silicon proportion as material of the workpiece, the pitch of the radial distance function of the pressing lands is selected from a lower or the lowermost category, and the size of the pressing surfaces of the cold forming pressing lobes is selected from an upper or the uppermost category, and the pitch of the radial extension function of the cold forming pressing lobes or the forming height is selected from a lower or the lowermost category,
c) in the case of a poorly flowing, abrasive steel material, as material of the workpiece, the pitch of the radial distance function of the pressing lands is selected from a lower or the lowermost category, and the size of the pressing surfaces of the cold forming pressing lobes is selected from an upper or the uppermost category, and the pitch of the radial extension function of the cold forming pressing lobes or the forming height is selected from a lower or the lowermost category,
d) in the case of a readily flowing steel material, as material of the workpiece, the pitch of the radial distance function of the pressing lands is selected from an intermediate-ate or an upper category, and the size of the pressing surfaces of the cold forming pressing lobes is selected from an upper category, and the pitch of the radial extension function of the cold forming pressing lobes or the forming height is selected from an intermediate category,
e) in the case of a stainless steel material, such as a VA steel, the pitch of the radial distance function of the pressing lands is selected from an intermediate or an upper category, and the size of the pressing surfaces of the cold forming pressing lobes is selected from a lower or the lowermost category, and the pitch of the radial extension function of the cold forming pressing lobes or the forming height is selected from a lower or an intermediate category,
f) in the case of a tough, high-strength steel material, as material of the workpiece, the pitch of the radial distance function of the pressing lands is selected from an average or upper category, and the size of the pressing surfaces of the cold forming pressing lobes is selected from an average category, and the pitch of the radial extension function of the cold forming pressing lobes or the forming height is selected from an average or an upper category,
g) in the case of a soft steel material, as material of the workpiece, the pitch of the radial distance function of the pressing lands is selected from an upper or the uppermost category, and the size of the pressing surfaces of the cold forming pressing lobes is selected from a lower or the lowermost category, and the pitch of the radial extension function of the cold forming pressing lobes or the forming height is selected from an upper or the uppermost category.

8. Tool according to claim 1, in which,
a) in the case of a wrought aluminum alloy as material of the workpiece, the pitch of the radial distance function of the pressing lands is selected from a value range of 45% up to 100% above a distance base value, and the size of the pressing surfaces of the cold forming pressing lobes is selected from a value range of 0% up to 50% above a surface base value, and the pitch of the radial extension function of the cold forming pressing lobes or the forming height is preferably also selected from a value range of 50% up to 100% above an extension base value,
b) in the case of a cast aluminum alloy with a silicon proportion as material of the workpiece, the pitch of the radial distance function of the pressing lands is selected from a value range of 0% up to 55% above the distance base value, and the size of the pressing surfaces of the cold forming pressing lobes is selected from a value range of 50% up to 100% above the surface base value, and the pitch of the radial extension function of the cold forming pressing lobes or the forming height is selected from value range of 5% up to 55% above the extension base value,
c) in the case of a poorly flowing, abrasive steel material, as material of the workpiece, the pitch of the radial distance function of the pressing lands is selected from a value range of 0% up to 55% above the distance base value, and the size of the pressing surfaces of the cold forming pressing lobes is selected from value range of 50% up to 100% above the surface base value and the pitch of the radial extension function of the cold forming pressing lobes or the forming height is selected from a value range of 0% up to 50% above the extension base value,
d) in the case of a readily flowing steel material, as material of the workpiece, the pitch of the radial distance function of the pressing lands is selected from a value range of 35% up to 85% above the distance base value, and the size of the pressing surfaces of the cold forming pressing lobes is selected from a value range of 40% up to 90% above the surface base value, and the pitch of the radial extension function of the cold forming pressing lobes or the forming height is selected from a value range of 30% up to 80% above the extension base value,
e) in the case of a stainless steel material, as material of the workpiece, the pitch of the radial distance function of the pressing lands is selected from a value range of 25% up to 80% above the distance base value, and the size of the pressing surfaces of the cold forming pressing lobes is selected from a value range of 0% up to 50% above the surface base value, and the pitch of the radial ex-tension function of the cold forming pressing lobes or the forming height is selected from a value range of 5% up to 60% above the extension base value,
f) in the case of a tough, high-strength steel material, as material of the workpiece, the pitch of the radial distance function of the pressing lands is selected from a value range of 40% up to 95% above the distance base value, and the size of the pressing surfaces of the cold forming pressing lobes is selected from a value range of 30% up to 80% above the surface base value, and the pitch of the radial extension function of the cold forming pressing lobes or the forming height is selected from a value range of 45% up to 95% above the extension base value, g) in the case of a soft steel material, as material of the workpiece, the pitch of the radial distance function of the pressing lands is selected from a value range of 45% up to 100% above the distance base value, and the size of the pressing surfaces of the cold forming pressing lobes is selected from a value range of 0% up to 55% above the surface base value, and the pitch of the radial extension function of the cold forming pressing lobes or the forming height is selected from a value range of 50% up to 100% above the extension base value.

9. Tool according to claim 1, in which the material of the tool, at least in the region of the cold forming pressing lobes, is adapted to the material of the workpiece, in particular with regard to wear resistance and/or toughness.

10. Tool according to claim 1, in which a surface coating is arranged on the tool at least in the region of the cold forming pressing lobes, and the material of the surface coating is adapted to the material of the workpiece, in particular with regard to sliding friction, hardness and/or thermal stability.

11. Tool according to claim 1, in which the shape, in particular the cross-sectional shape, of the pressing lands, in particular their radial curvature perpendicularly to the feed direction of the cold forming pressing lobes, is adapted to the material of the workpiece.

12. Tool according to claim 1, in which the cold forming pressing lobes are arranged so as to follow one another in an arrangement helically encircling the tool axis or are formed on a thread-forming profile which is formed radially outwards and helically encircles the tool axis.

13. Tool according to claim 1, in which at least some of the cold forming pressing lobes are arranged so as to follow one another essentially in a plane containing the tool axis and/or in which at least two groups of several cold forming pressing lobes are provided, the cold forming pressing lobes in each group being arranged in an arrangement running perpendicularly to the tool axis about the tool axis or being arranged on a thread-forming profile encircling the tool axis perpendicularly to the tool axis in an annular or closed manner.

14. Tool according to claim 1, which is adapted to the material of the workpiece by virtue of the fact that the number of cold forming pressing lobes along an arrangement about the tool axis and/or with the extension function or for setting the radially increasing extension function, in particular in the entry or initial-forming region, is selected as a function of the material of the workpiece.

15. Tool according to claim 1, having a tool core or tool shank, the cold forming pressing lobes being arranged on an outer surface of the tool core or tool shank and/or grooves being provided at the circumference of the tool and/or passages being provided in the interior of the tool for feeding a fluid medium, in particular a coolant and/or lubricant.

16. Tool according to claim 1, some of the axially offset cold forming pressing lobes, in particular in a guide region, having the same radial distance.

17. Tool for producing a thread using cold forming,
a) which is rotatable about a tool axis and
b) comprises a plurality of cold forming pressing lobes, which:
  b1) are arranged axially offset from one another; and
  b2) are intended for cold forming the thread into a surface of a workpiece; and
  b3) each tool comprises a central pressing land which runs in a feed direction of the cold forming pressing lobe relative to the workpiece, and forms a pressing lobe region projecting radially furthest to an outside and/or is essentially reproduced on the thread root of the thread produced in the workpiece;
c) the tool being adapted to the material of the workpiece;
  c1) by virtue of the fact that, at least at some of the cold forming pressing lobes, the radial distance of the pressing land increases monotonically, preferably strictly monotonically, against the feed direction according to a predetermined radial distance function up to a maximum radial distance, and that this radial distance function of the pressing land of each cold forming pressing lobe is selected as a function of the material of the workpiece; and
  c2) by virtue of the fact that the pressing surfaces, coming into engagement or contact with the workpiece, of the cold forming pressing lobes are selected in shape and/or size and/or arrangement as a function of the material of the workpiece;
d) radial being defined as perpendicular to the tool axis and axial being defined as along or parallel to the tool axis;
e) wherein, for a predetermined selection of materials of the workpiece:
  the a pitch of the radial extension function of the cold forming pressing lobes, a pitch of the radial distance function of the pressing lands, and the size of the pressing surfaces of the cold forming pressing lobes, are in each case subdivided into three categories with regard to the values to be set, comprising:
  at least one lowermost category having at least one lowest value or having a lowest value range;
  at least one uppermost category having at least one highest value or having a highest value range; and
  at least one average or middle or intermediate category having at least one intermediate or average value, or having an intermediate or average.

* * * * *